(12) United States Patent
Frantz et al.

(10) Patent No.: US 11,567,955 B2
(45) Date of Patent: Jan. 31, 2023

(54) DYNAMICALLY NORMALIZING INTERVALS IN A TABLE

(71) Applicant: SIGMA COMPUTING, INC., San Francisco, CA (US)

(72) Inventors: Jason D. Frantz, San Francisco, CA (US); Max H. Seiden, San Francisco, CA (US); James L. Gale, San Francisco, CA (US); Joseph Bates, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 231 days.

(21) Appl. No.: 16/862,869

(22) Filed: Apr. 30, 2020

(65) Prior Publication Data

US 2020/0349156 A1 Nov. 5, 2020

Related U.S. Application Data

(60) Provisional application No. 62/841,495, filed on May 1, 2019.

(51) Int. Cl.
*G06F 7/00* (2006.01)
*G06F 16/2458* (2019.01)
(Continued)

(52) U.S. Cl.
CPC ........ *G06F 16/2465* (2019.01); *G06F 16/211* (2019.01); *G06F 16/2282* (2019.01);
(Continued)

(58) Field of Classification Search
CPC ............. G06F 16/2465; G06F 16/2428; G06F 16/2282; G06F 16/2445; G06F 16/211; G06F 16/2456; G06F 16/283
See application file for complete search history.

(56) References Cited

U.S. PATENT DOCUMENTS 9,483,545 B2 * 11/2016 Bester ................ G06F 16/2282
2003/0018644 A1 * 1/2003 Bala ........................ G06F 40/18
(Continued)

FOREIGN PATENT DOCUMENTS

EP 1610231 A2 * 12/2005
EP 1610231 A2    12/2005
EP 1610231 A2 * 12/2015

OTHER PUBLICATIONS

Sigma Computing: Sigma Computing—Product Tour; You tube, Jun. 14, 2018.*

(Continued)

*Primary Examiner* — Daniel A Kuddus

(57) ABSTRACT

Dynamically normalizing intervals in a table including receiving, from a client computing system, a request to normalize intervals for a data set on a cloud-based data warehouse, wherein the request comprises a reference to the data set and a data range; generating, on the cloud-based data warehouse, an interval table using the data range; joining, into a joined table on the cloud-based data warehouse, the interval table and the data set; receiving the joined table from the cloud-based data warehouse; and presenting, via a graphical user interface on the client computing system, the joined table as a worksheet.

20 Claims, 6 Drawing Sheets

(51) Int. Cl.
   *G06F 16/242* (2019.01)
   *G06F 16/22* (2019.01)
   *G06F 16/21* (2019.01)
   *G06F 16/2455* (2019.01)
   *G06F 16/28* (2019.01)

(52) U.S. Cl.
   CPC ...... *G06F 16/2428* (2019.01); *G06F 16/2445* (2019.01); *G06F 16/2456* (2019.01); *G06F 16/283* (2019.01)

(56) References Cited

U.S. PATENT DOCUMENTS

| | | | | |
|---|---|---|---|---|
| 2006/0085177 | A1* | 4/2006 | Toyama | G01C 21/26 703/22 |
| 2006/0112123 | A1* | 5/2006 | Clark | G06F 40/18 |
| 2013/0041874 | A1* | 2/2013 | Dohm | G06F 16/958 707/E17.127 |
| 2014/0244573 | A1* | 8/2014 | Gonsalves | G06F 16/283 707/606 |
| 2015/0347783 | A1* | 12/2015 | Rodniansky | H04L 67/10 707/783 |
| 2017/0262507 | A1* | 9/2017 | Chandrashekar | G06F 16/252 |
| 2018/0210837 | A1* | 7/2018 | Baruch | G06F 3/0665 |
| 2018/0285396 | A1* | 10/2018 | Chkodrov | G06F 16/258 |

OTHER PUBLICATIONS

3 Ways to Group Times in Excel, Jon Acampora; XPO55721749 retrieved from the internet Oct. 13, 2015 (Year: 2015).*
Acampora, 3 Ways to Group Times in Excel, Excel Campus, URL: https://www.excelcampus.com/charts/group-times-in-excel/, dated Oct. 13, 2015, 7 pages.
Acampora, 3 Ways to Group Times in Excel, Excel Campus, URL: https://www.excelcampus.com/charts/group-times-in-excel/. Spreadsheet Demonstration, dated Oct. 13, 2015, 7 pages.
International Search Report and Written Opinion, PCT/US2020/030888, dated Aug. 20, 2020, 14 pages.
Sigma Computing, Sigma Computing—Product Tour, URL: https://www.youtube.com/watch?v=nkcprbRiztY, dated Jun. 14, 2018, 1 page.
Sigma Computing, Why Sigma?—Whiteboard Talk from Jason Frantz, URL: https://www.youtube.com/watch?v=W4O8G-mQIOE, dated Nov. 13, 2018, 1 page.

* cited by examiner

DYNAMICALLY NORMALIZING INTERVALS IN A TABLE

CROSS-REFERENCE TO RELATED APPLICATION

This application is a non-provisional application for patent entitled to a filing date and claiming the benefit of earlier-filed U.S. Provisional Patent Application Ser. No. 62/841,495, filed May 1, 2019.

BACKGROUND

Field of the Invention

The field of the invention is data processing, or, more specifically, methods, apparatus, and products for dynamically normalizing intervals in a table.

Description of Related Art

Modern businesses may store large amounts of data in remote databases within cloud-based data warehouses. This data may be accessed using database query languages, such as structured query language (SQL). Few users, however, are able to fully utilize all information stored in the database. Further, manipulating the data stored in the database may require constructing complex queries beyond the abilities of most users.

SUMMARY

Methods, systems, and apparatus for dynamically normalizing intervals in a table. Dynamically normalizing intervals in a table includes receiving, from a client computing system, a request to normalize intervals for a data set on a cloud-based data warehouse, wherein the request comprises a reference to the data set and a data range; generating, on the cloud-based data warehouse, an interval table using the data range; joining, into a joined table on the cloud-based data warehouse, the interval table and the data set; receiving the joined table from the cloud-based data warehouse; and presenting, via a graphical user interface on the client computing system, the joined table as a worksheet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
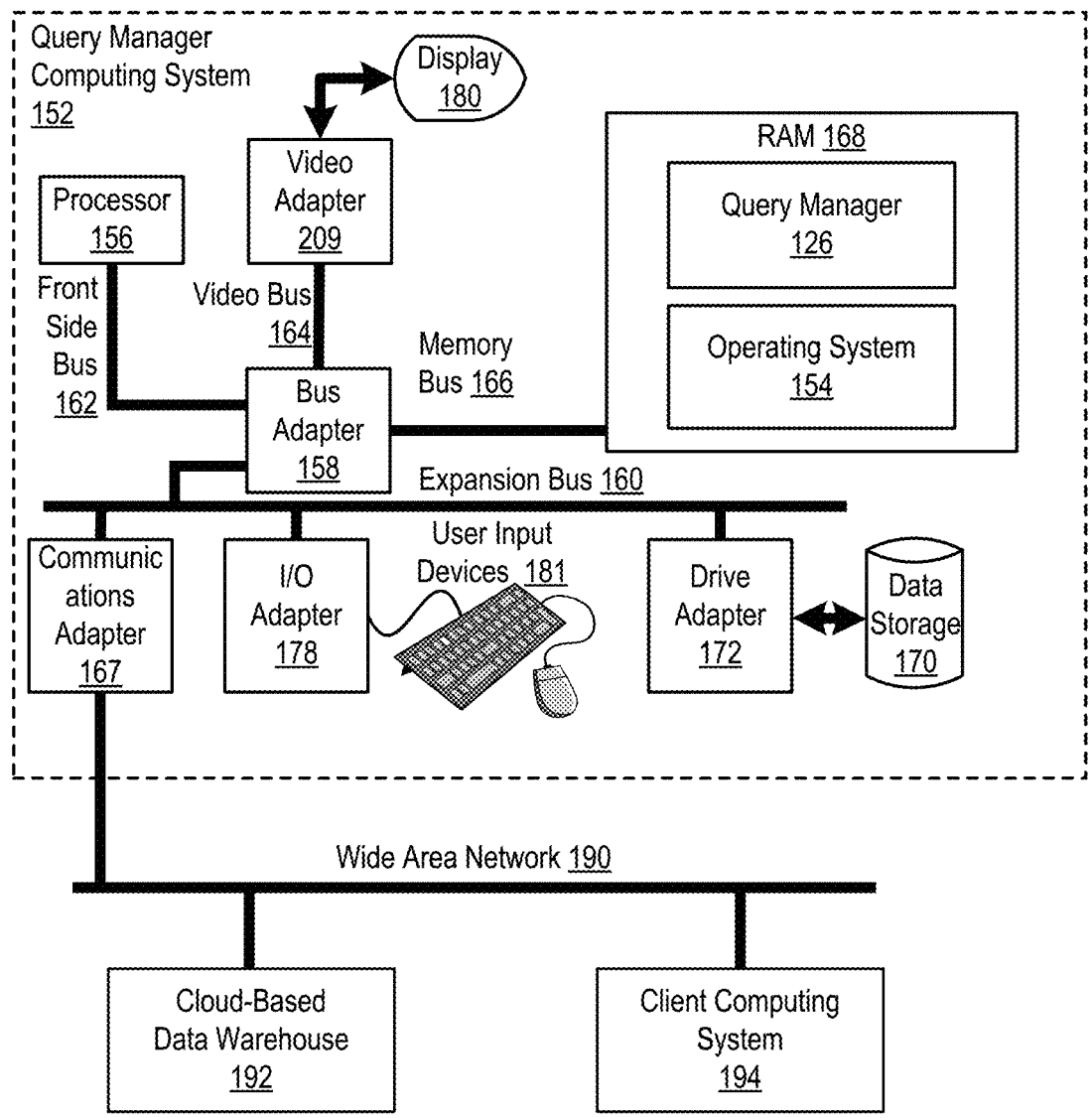
FIG. 1 sets forth a block diagram of an example system configured for dynamically normalizing intervals in a table according to embodiments of the present invention.

Exemplary methods, apparatus, and products for dynamically normalizing intervals in a table in accordance with the present invention are described with reference to the accompanying drawings, beginning with FIG. 1. FIG. 1 sets forth a block diagram of automated computing machinery comprising an exemplary query manager computing system (152) configured for dynamically normalizing intervals in a table according to embodiments of the present invention. The query manager computing system (152) of FIG. 1 includes at least one computer processor (156) or 'CPU' as well as random access memory (168) ('RAM') which is connected through a high speed memory bus (166) and bus adapter (158) to processor (156) and to other components of the query manager computing system (152).

Stored in RAM (168) is an operating system (154). Operating systems useful in computers configured for dynamically normalizing intervals in a table according to embodiments of the present invention include UNIX, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the query manager (126), a module for dynamically normalizing intervals in a table according to embodiments of the present invention.

The query manager computing system (152) of FIG. 1 includes disk drive adapter (172) coupled through expansion bus (160) and bus adapter (158) to processor (156) and other components of the query manager computing system (152). Disk drive adapter (172) connects non-volatile data storage to the query manager computing system (152) in the form of data storage (170). Disk drive adapters useful in computers configured for dynamically normalizing intervals in a table according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example query manager computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example query manager computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary query manager computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for dynamically normalizing intervals in a table according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the query manager (126) on the query manager computing system (152).

Figure 2:
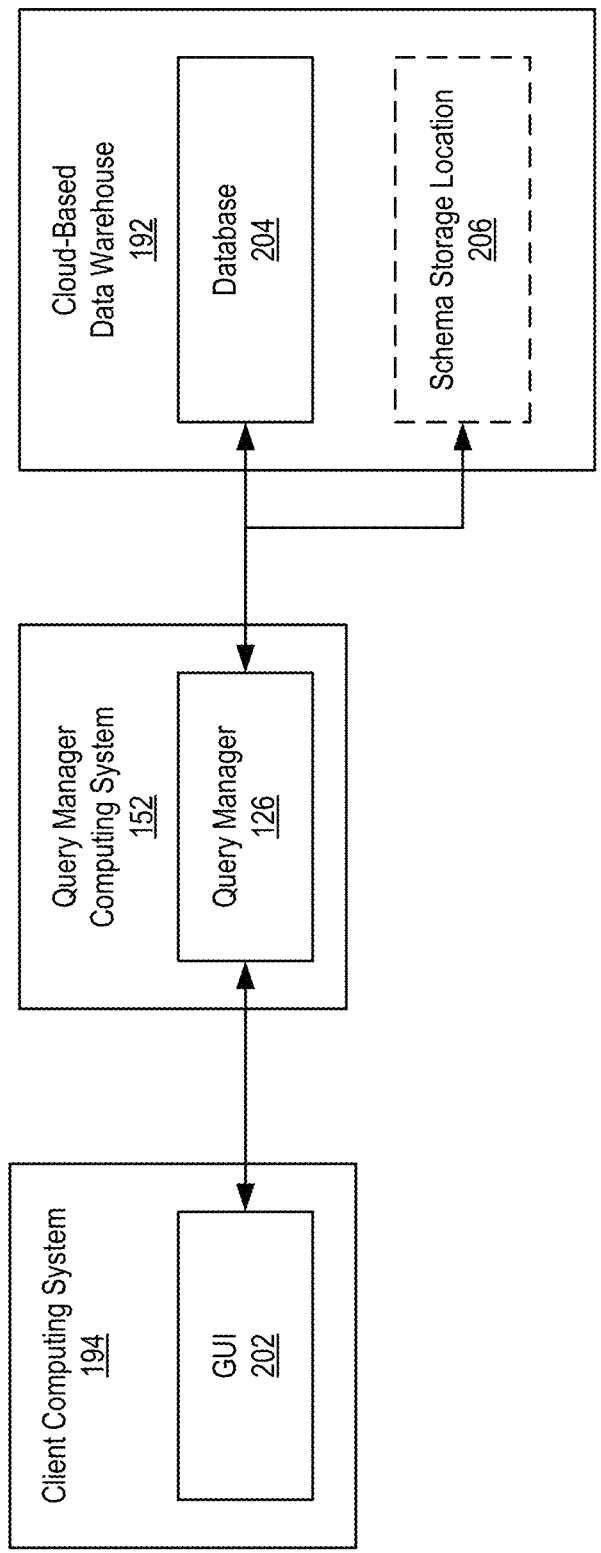
FIG. 2 sets forth a block diagram of an example system configured for dynamically normalizing intervals in a table according to embodiments of the present invention.

FIG. 2 shows an exemplary block diagram of a system for dynamically normalizing intervals in a table according to embodiments of the present invention. As shown in FIG. 2, the system includes a client computing system (194), a query manager computing system (152), and a cloud-based data warehouse (192). The client computing system (194) includes a graphical user interface (GUI) (202) that may be part of a query manager client. The query manager computing system (152) includes a query manager (126). The cloud-based data warehouse (192) includes a database (204) and a schema storage location (206).

The query manager (126) is hardware, software, or an aggregation of hardware and software configured to receive requests from the client computing system (194), via the GUI (GUI). The query manager (126) is also configured to generate database queries in response to requests for data sets and manipulations of those data sets, such as normalizing intervals for a data set.

The database (206) is a collection of data and a management system for the data. A database table is a collection of data from the database (206). The database table may be an organization of data generated in response to a database query and provided to the query manager (126). The database table may include data organized into columns and rows.

The database (206) may be accessible primarily by a database administrator. Changes to the database (206) may be closely managed, and most users and entities, including a user of the client computing system (194) and the query manager (126), may be limited to read-only access to the database (206). On some cloud-based data warehouses, a database administrator may grant a query manager (126) read and write access to a schema storage location (206) isolated from the rest of the database (204). The schema storage location (206) is a storage location on the cloud-based data warehouse (192) to which the query manager (126) has read and write access. The query manager (126) may only have read-only access to the remainder of the cloud-based data warehouse (192), including data sets in the database (204).

The query manager (126) may send a single database query to the cloud-based data warehouse (192) that targets both the database (204) and the schema storage location (206). The query may also include instructions to create and store elements (such as tables) in the schema storage location (206), and to perform computations on the cloud-based data warehouse (192) using data from either the database (204), tables in the schema storage location (206), or both.

The GUI (202) is a visual presentation configured to request, from the query manager (126), that a table be normalized based on a data range. The GUI (202) may also present data sets in the form of a worksheet and graphical elements to a client and receives client input from the client. The GUI may be presented, in part, by the query manager (126) and displayed on a client computing system (194) (e.g., on a system display or mobile touchscreen). The query manager client (202) may be an Internet application hosted on the query manager computing system (152) and initiate the presentation of the GUI on the client computing system (194).

Figure 3:
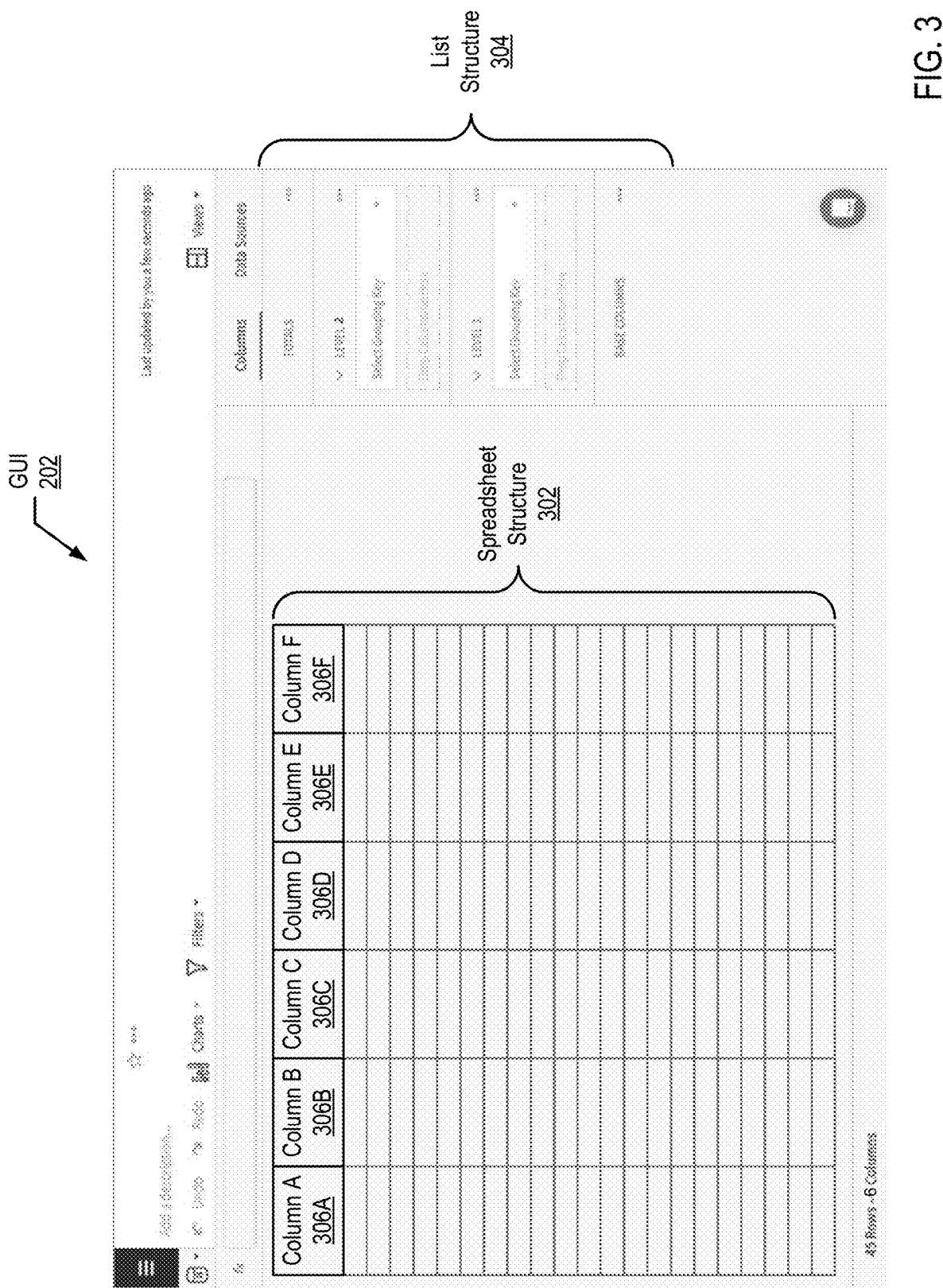
FIG. 3 sets forth a block diagram of an example graphical user interface configured for dynamically normalizing intervals in a table according to embodiments of the present invention.

FIG. 3 shows an exemplary graphical user interface (GUI) for dynamically normalizing intervals in a table according to embodiments of the present invention. As shown in FIG. 3, the exemplary GUI (202) includes a spreadsheet structure (302) and a list structure (304). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculations using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

Figure 4:
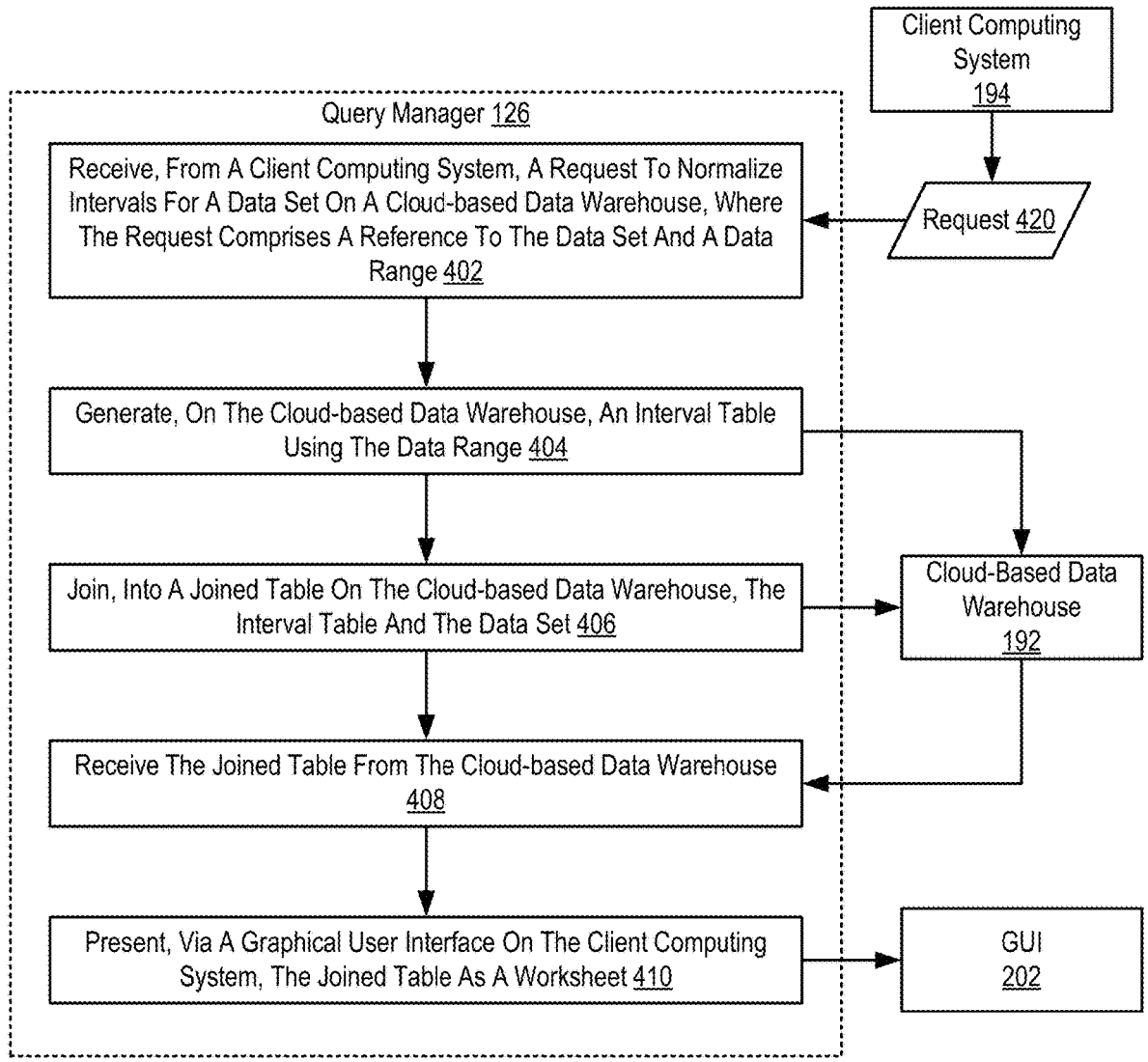
FIG. 4 sets forth a flow chart illustrating an exemplary method for dynamically normalizing intervals in a table according to embodiments of the present invention.

For further explanation, FIG. 4 sets forth a flow chart illustrating an exemplary method for dynamically normalizing intervals in a table according to embodiments of the present invention that includes receiving (402), from a client computing system (194), a request (420) to normalize intervals for a data set on a cloud-based data warehouse (192), wherein the request (420) comprises a reference to the data set and a data range. Receiving (402), from a client computing system (194), a request (420) to normalize intervals for a data set on a cloud-based data warehouse (192), wherein the request (420) comprises a reference to the data set and a data range may be carried out by the query manager (126) detecting a selection and input via the GUI (202) of the client computing system (194).

The reference to the data set is an identifier of a group of data elements on the cloud-based data warehouse (192). The reference to the data set may be an identifier of a table in a database. The query manager (126) may present, via the GUI (202), a list of tables on the database and receive, via the GUI (202) a selection of one of the tables as the reference to the data set.

The data range defines the structure of the interval table. The data range may include a minimum value, a maximum value, and an interval. The minimum value describes the beginning value of the interval table. The maximum value describes the last value of the interval table. The interval describes the number and division of rows in the interval table. For example, the data range may include a minimum value of 12 AM on May 1, a maximum value of 12 AM on May 2, and an interval of one hour. This data range defines the interval table as having 24 rows, one for each hour between 12 AM on May 1 and 12 AM on May 2.

The method of FIG. 4 further includes generating (404), on the cloud-based data warehouse (192), an interval table using the data range. Generating (404), on the cloud-based data warehouse (192), an interval table using the data range may be carried out by the query manager (126) storing the interval table in a schema storage location on the cloud-based data warehouse (192). Alternatively, generating (404), on the cloud-based data warehouse (192), an interval table using the data range may be carried out by the query manager (126) dynamically generating (602) the interval table on the cloud-based data warehouse (192) using a query statement.

Generating (404), on the cloud-based data warehouse (192), an interval table using the data range may include generating rows of integers and converting the integers based on the data range. Specifically, the interval table may be generated using placeholder values in the form of integers. Once the interval table is created that meets the requirements of the data range, each integer may then be converted based on the interval. Continuing with the example above, the interval table may initially be generated with 24 rows containing values 1 through 24. The first integer (1) may then be converted to a value representing 12 AM on May 1 (e.g. 2019:05:01:00:00). The second integer (2) may then be converted to a value representing 1 AM on May 1 (e.g. 2019:05:01:01:00), and so on.

The method of FIG. 4 further includes joining (406), into a joined table on the cloud-based data warehouse (192), the interval table and the data set. Joining (406), into a joined table on the cloud-based data warehouse (192), the interval table and the data set may be carried out by the query manager (126) performing a join operation (e.g., a right join operation) using the data set and the generated interval table. The join operation may store a null value for rows of the interval table for which there is no corresponding data from the data set. Consequently, the joined table may include at least one row that is not included in the data set. The joined table may include at least one row for each row in the interval table and at least one row for each record in the data set.

Generating (404), on the cloud-based data warehouse (192), an interval table using the data range and joining (406), into a joined table on the cloud-based data warehouse (192), the interval table and the data set may include the query manager (126) composing a database query to generate, on the cloud-based data warehouse, the interval table using the data range and join, into the joined table on the cloud-based data warehouse, the interval table and the data set. The query manager (126) may then send the database query to the cloud-based data warehouse.

The method of FIG. 4 further includes receiving (408) the joined table from the cloud-based data warehouse (192). Receiving (408) the joined table from the cloud-based data warehouse (192) may be carried out by the query manager (126) receiving a query response from the cloud-based data warehouse (192) that includes the joined table.

The method of FIG. 4 further includes presenting (410), via a graphical user interface (202) on the client computing system (194), the joined table as a worksheet. Presenting (410), via a graphical user interface (202) on the client computing system (194), the joined table as a worksheet may be carried out by the query manager (126) converting the joined table into a worksheet suitable for presentation through the GUI (202) on the client computing system (194). The worksheet may include interactive elements and functions, such as the ability to sort and add calculation columns to the worksheet.

As an example of the above, consider the following data set in Table 1 with data indicating the signup times of new users of a social networking service.

TABLE 1

| Time | User Identifier | User Location |
|---|---|---|
| 2019:05:01:00:00:45 | IEK245698701 | U.S.A |
| 2019:05:01:01:22:01 | IEK245698702 | Mexico |
| 2019:05:01:02:48:56 | IEK245698703 | Canada |
| 2019:05:01:03:02:42 | IEK245698704 | Canada |
| 2019:05:01:04:50:15 | IEK245698705 | Ukraine |
| 2019:05:01:04:16:00 | IEK245698706 | U.S.A |
| 2019:05:01:06:00:18 | IEK245698707 | U.S.A |
| 2019:05:01:06:26:26 | IEK245698708 | Australia |

TABLE 1-continued

| Time | User Identifier | User Location |
|---|---|---|
| 2019:05:01:06:33:12 | IEK245698709 | Australia |
| 2019:05:01:09:41:44 | IEK245698710 | Mexico |
| 2019:05:01:10:02:58 | IEK245698711 | Mexico |
| 2019:05:01:10:49:37 | IEK245698712 | Sweden |

Assume that a user requests to normalize the data set in Table 1 over a period of 12 hours from May 1 at 12 AM to May 1 at 12 PM. The user generates a request with the reference to the data set in Table 1 and a data range that includes a minimum value of 2019:05:01:00:00:00, a maximum value of 2019:05:01:12:00:00, and an interval of 1 hour. Using the minimum value, maximum value, and interval, the query manager (126) generates the interval table shown in Table 2.

TABLE 2

| Time Interval |
|---|
| 2019:05:01:00 |
| 2019:05:01:01 |
| 2019:05:01:02 |
| 2019:05:01:03 |
| 2019:05:01:04 |
| 2019:05:01:05 |
| 2019:05:01:06 |
| 2019:05:01:07 |
| 2019:05:01:08 |
| 2019:05:01:09 |
| 2019:05:01:10 |
| 2019:05:01:11 |

The query manager (126) may then join the interval table of Table 2 with the data set of Table 1 into the joined table shown in Table 3.

TABLE 3

| Time Interval | Time | User Identifier | User Location |
|---|---|---|---|
| 2019:05:01:00 | 2019:05:01:00:00:45 | IEK245698701 | U.S.A |
| 2019:05:01:01 | 2019:05:01:01:22:01 | IEK245698702 | Mexico |
| 2019:05:01:02 | 2019:05:01:02:48:56 | IEK245698703 | Canada |
| 2019:05:01:03 | 2019:05:01:03:02:42 | IEK245698704 | Canada |
| 2019:05:01:04 | 2019:05:01:04:50:15 | IEK245698705 | Ukraine |
|  | 2019:05:01:04:16:00 | IEK245698706 | U.S.A |
| 2019:05:01:05 | Null | Null | Null |
| 2019:05:01:06 | 2019:05:01:06:00:18 | IEK245698707 | U.S.A |
|  | 2019:05:01:06:26:26 | IEK245698708 | Australia |
|  | 2019:05:01:06:33:12 | IEK245698709 | Australia |
| 2019:05:01:07 | Null | Null | Null |
| 2019:05:01:08 | Null | Null | Null |
| 2019:05:01:09 | 2019:05:01:09:41:44 | IEK245698710 | Mexico |
| 2019:05:01:10 | 2019:05:01:10:02:58 | IEK245698711 | Mexico |
|  | 2019:05:01:10:49:37 | IEK245698712 | Sweden |
| 2019:05:01:11 | Null | Null | Null |

The joined table of Table 3 may then be received by the query manager (126) from the cloud-based data warehouse (192) and presented as a worksheet on the GUI (202) of the client computing system (194). Presenting the joined table as a worksheet may include, for example, converting the null values to zeros or empty cells.

The above limitations improve the operation of the computer system by normalizing intervals for data sets that may lack data for each desired interval. Specifically, joining the interval table to the data set enables more robust calculations to be made using the data. For example, an accurate comparison of data for one interval to the preceding interval may be made even if the preceding interval has no data. As another example, a rolling average at each interval may be calculated using the previous intervals even if those intervals include no data.

Figure 5:
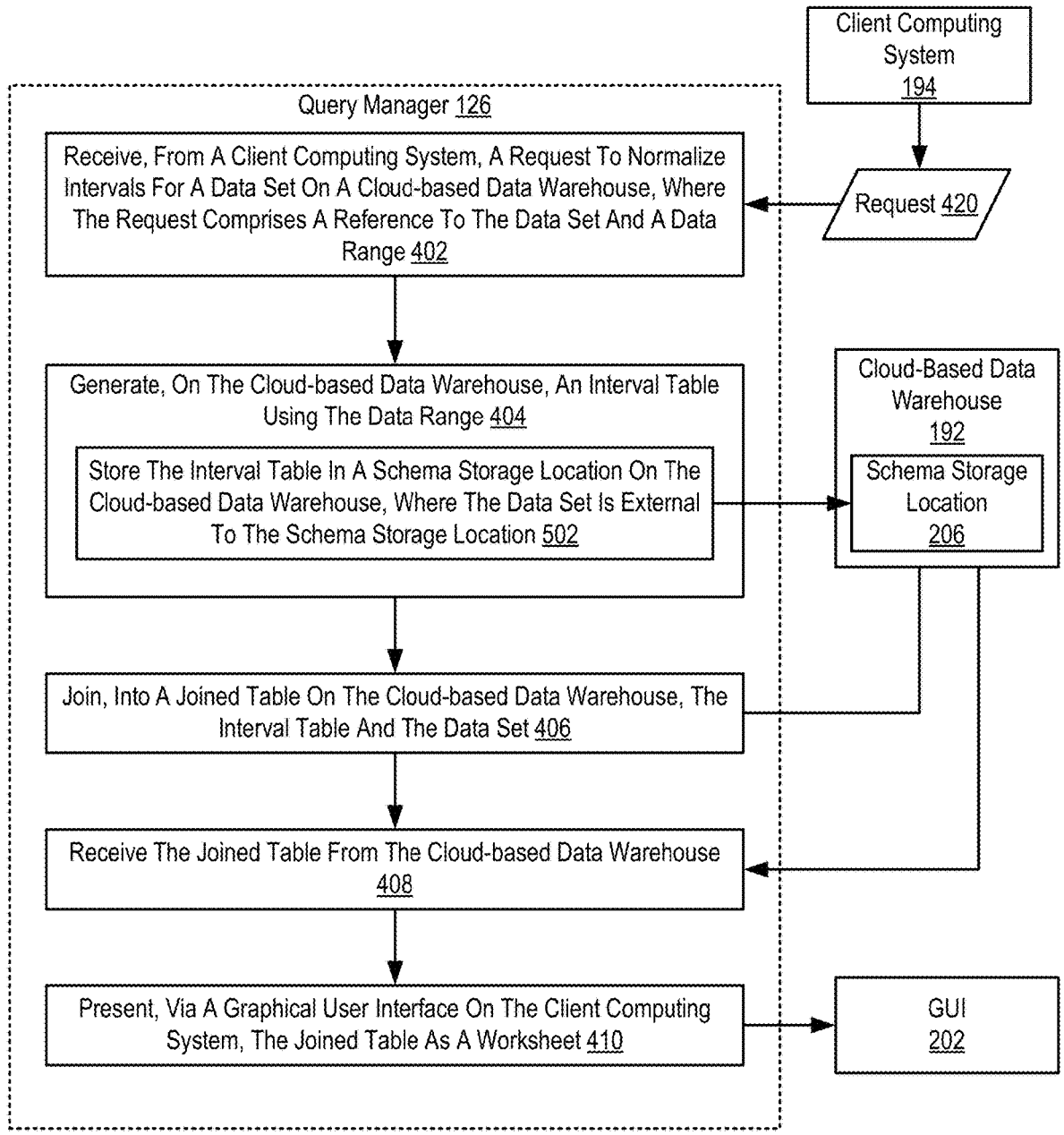
FIG. 5 sets forth a flow chart illustrating an exemplary method for dynamically normalizing intervals in a table according to embodiments of the present invention.

For further explanation, FIG. 5 sets forth a flow chart illustrating a further exemplary method for dynamically normalizing intervals in a table according to embodiments of the present invention that includes receiving (402), from a client computing system (194), a request (420) to normalize intervals for a data set on a cloud-based data warehouse (192), wherein the request (420) comprises a reference to the data set and a data range; generating (404), on the cloud-based data warehouse (192), an interval table using the data range; joining (406), into a joined table on the cloud-based data warehouse (192), the interval table and the data set; receiving (408) the joined table from the cloud-based data warehouse (192); and presenting (410), via a graphical user interface (202) on the client computing system (194), the joined table as a worksheet.

The method of FIG. 5 differs from the method of FIG. 4, however, in that generating (404), on the cloud-based data warehouse (192), an interval table using the data range includes storing (502) the interval table in a schema storage location (206) on the cloud-based data warehouse (192), wherein the data set is external to the schema storage location (206). Storing (502) the interval table in a schema storage location (206) on the cloud-based data warehouse (192), wherein the data set is external to the schema storage location (206) may be carried out by the query manager (126) sending instructions to the cloud-based data warehouse (192) to generate a table of integers in the schema storage location (206). The table of integers may then be converted to the appropriate intervals as necessary.

Storing (502) the interval table in a schema storage location (206) on the cloud-based data warehouse (192), wherein the data set is external to the schema storage location (206) may also be carried out by the query manager (126) generating the interval table on the query manager computing system and transferring the interval table to the schema storage location (206). The query manager (126) may maintain a table of integers in the schema storage location (206) and reuse the table of integers for new interval tables as necessary. The table of integers may be converted to the necessary intervals each time the table is used.

Figure 6:
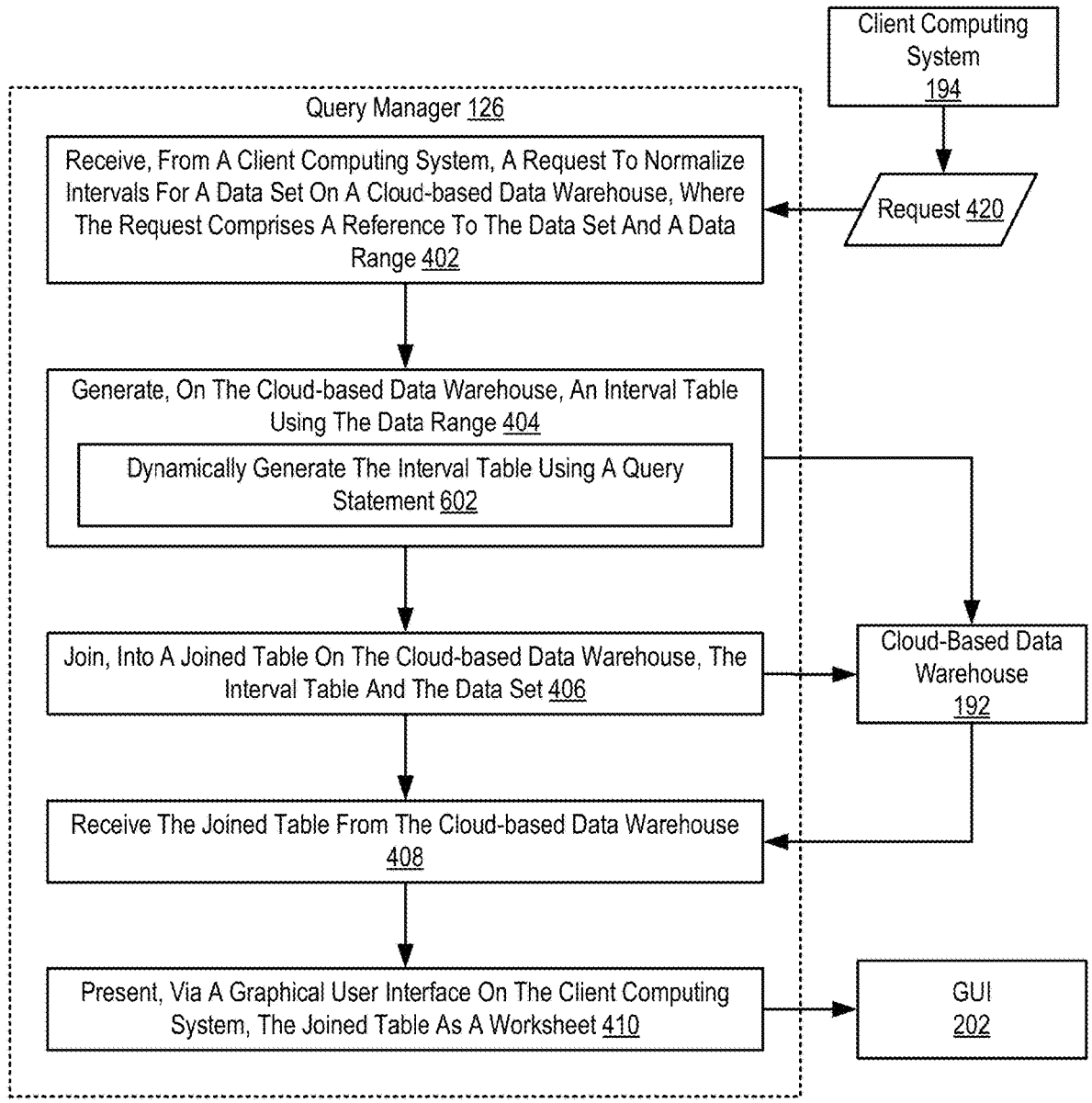
FIG. 6 sets forth a flow chart illustrating an exemplary method for dynamically normalizing intervals in a table according to embodiments of the present invention.

For further explanation, FIG. 6 sets forth a flow chart illustrating a further exemplary method for dynamically normalizing intervals in a table according to embodiments of the present invention that includes receiving (402), from a client computing system (194), a request (420) to normalize intervals for a data set on a cloud-based data warehouse (192), wherein the request (420) comprises a reference to the data set and a data range; generating (404), on the cloud-based data warehouse (192), an interval table using the data range; joining (406), into a joined table on the cloud-based data warehouse (192), the interval table and the data set; receiving (408) the joined table from the cloud-based data warehouse (192); and presenting (410), via a graphical user interface (202) on the client computing system (194), the joined table as a worksheet.

The method of FIG. 6 differs from the method of FIG. 4, however, in that generating (404), on the cloud-based data warehouse (192), an interval table using the data range includes dynamically generating (602) the interval table using a query statement. Dynamically generating (602) the interval table using a query statement may be carried out by the query manager (126) sending a query statement to the cloud-based data warehouse (192) instructing the cloud-based data warehouse (192) to generate the interval table using the data range. The interval table is generated dynamically in that the interval table is not created until the data range is received in the request to normalize intervals for the data set.

In view of the explanations set forth above, readers will recognize that the benefits of dynamically normalizing intervals in a table according to embodiments of the present invention include:
  Improving the operation of a computing system by normalizing intervals for data sets that may lack data for each desired interval, increasing computing system accuracy and efficiency.
  Improving the operation of a computing system by dynamically adding rows for missing data in a data set enabling robust calculations to be made using the data within the data set, increasing computing system accuracy and efficiency.

Exemplary embodiments of the present invention are described largely in the context of a fully functional computer system for dynamically normalizing intervals in a table. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically normalizing intervals in a table, the method comprising:
    receiving, from a client computing system, a request to normalize intervals for a data set on a cloud-based data warehouse, wherein the request comprises a reference to the data set and a data range, wherein the data range comprises a minimum value, a maximum value, and an interval;
    generating, on the cloud-based data warehouse, an interval table using the data range by generating, as the interval table, a table comprising a plurality of rows each having a respective value from a range of values from the minimum value to the maximum value incremented by the interval;
    joining, into a joined table on the cloud-based data warehouse, the interval table and the data set, wherein the joined table comprises at least one row that is not included in the data set;
    receiving the joined table from the cloud-based data warehouse; and presenting, via a graphical user interface on the client computing system, the joined table as a worksheet.

2. The method of claim 1, wherein generating, on the cloud-based data warehouse, the interval table using the data range comprises storing the interval table in a schema storage location on the cloud-based data warehouse, wherein the data set is external to the schema storage location.

3. The method of claim 1, wherein the generating, on the cloud-based data warehouse, the interval table using the data range comprises dynamically generating the interval table using a query statement.

4. The method of claim 1, wherein generating, on the cloud-based data warehouse, the interval table using the data range comprises generating rows of integers and converting the integers based on the data range.

5. The method of claim 1, wherein generating, on the cloud-based data warehouse, the interval table using the data range and joining, into the joined table on the cloud-based data warehouse, the interval table and the data set comprise:
    composing a database query to generate, on the cloud-based data warehouse, the interval table using the data range and join, into the joined table on the cloud-based data warehouse, the interval table and the data set; and
    sending the database query to the cloud-based data warehouse.

6. The method of claim 1, further comprising storing a null value in the at least one row of the joined table that is not included in the data set.

7. The method of claim 1, wherein the joined table includes at least one row for each row in the interval table and at least one row for each record in the data set.

8. An apparatus for dynamically normalizing intervals in a table, the apparatus comprising a computer processor, a computer memory operatively coupled to the computer processor, the computer memory having disposed within it computer program instructions that, when executed by the computer processor, configure the apparatus to carry out the steps of:
    receiving, from a client computing system, a request to normalize intervals for a data set on a cloud-based data warehouse, wherein the request comprises a reference to the data set and a data range, wherein the data range comprises a minimum value, a maximum value, and an interval;
    generating, on the cloud-based data warehouse, an interval table using the data range by generating, as the interval table, a table comprising a plurality of rows each having a respective value from a range of values from the minimum value to the maximum value incremented by the interval;
    joining, into a joined table on the cloud-based data warehouse, the interval table and the data set, wherein the joined table comprises at least one row that is not included in the data set;
    receiving the joined table from the cloud-based data warehouse; and
    presenting, via a graphical user interface on the client computing system, the joined table as a worksheet.

9. The apparatus of claim 8, wherein generating, on the cloud-based data warehouse, the interval table using the data range comprises storing the interval table in a schema storage location on the cloud-based data warehouse, wherein the data set is external to the schema storage location.

10. The apparatus of claim 8, wherein the generating, on the cloud-based data warehouse, the interval table using the data range comprises dynamically generating the interval table using a query statement.

11. The apparatus of claim 8, wherein generating, on the cloud-based data warehouse, the interval table using the data range comprises generating rows of integers and converting the integers based on the data range.

12. The apparatus of claim 8, wherein generating, on the cloud-based data warehouse, the interval table using the data range and joining, into the joined table on the cloud-based data warehouse, the interval table and the data set comprise:

composing a database query to generate, on the cloud-based data warehouse, the interval table using the data range and join, into the joined table on the cloud-based data warehouse, the interval table and the data set; and sending the database query to the cloud-based data warehouse.

13. The apparatus of claim 8, wherein the steps further comprise storing a null value in the at least one row of the joined table that is not included in the data set.

14. The apparatus of claim 8, wherein the joined table includes at least one row for each row in the interval table and at least one row for each record in the data set.

15. A computer program product for dynamically normalizing intervals in a table, the computer program product comprising a non-transitory computer readable medium storing computer program instructions that, when executed, cause a computer to carry out the steps of:

receiving, from a client computing system, a request to normalize intervals for a data set on a cloud-based data warehouse, wherein the request comprises a reference to the data set and a data range, wherein the data range comprises a minimum value, a maximum value, and an interval;

generating, on the cloud-based data warehouse, an interval table using the data range by generating, as the interval table, a table comprising a plurality of rows each having a respective value from a range of values from the minimum value to the maximum value incremented by the interval;

joining, into a joined table on the cloud-based data warehouse, the interval table and the data set, wherein the joined table comprises at least one row that is not included in the data set;

receiving the joined table from the cloud-based data warehouse; and presenting, via a graphical user interface on the client computing system, the joined table as a worksheet.

16. The computer program product of claim 15, wherein generating, on the cloud-based data warehouse, the interval table using the data range comprises storing the interval table in a schema storage location on the cloud-based data warehouse, wherein the data set is external to the schema storage location.

17. The computer program product of claim 15, wherein the generating, on the cloud-based data warehouse, the interval table using the data range comprises dynamically generating the interval table using a query statement.

18. The computer program product of claim 15, wherein generating, on the cloud-based data warehouse, the interval table using the data range comprises generating rows of integers and converting the integers based on the data range.

19. The computer program product of claim 15, wherein generating, on the cloud-based data warehouse, the interval table using the data range and joining, into the joined table on the cloud-based data warehouse, the interval table and the data set comprise:

composing a database query to generate, on the cloud-based data warehouse, the interval table using the data range and join, into the joined table on the cloud-based data warehouse, the interval table and the data set; and sending the database query to the cloud-based data warehouse.

20. The computer program product of claim 15, wherein the joined table includes at least one row for each row in the interval table and at least one row for each record in the data set.

* * * * *